United States Patent
Huynh Tuong et al.

(10) Patent No.: US 11,958,773 B2
(45) Date of Patent: Apr. 16, 2024

(54) SPRAYING UHPFRC FOR REINFORCEMENT AND REGENERATION OF PRE-EXISTING STRUCTURES

(71) Applicant: SOLETANCHE FREYSSINET, Rueil Malmaison (FR)

(72) Inventors: Alain Huynh Tuong, Neuilly sur Seine (FR); Bertrand Petit, Ecully (FR); François Teply, Marseilles (FR); Cédric-Olivier Chaux, Duerne (FR)

(73) Assignee: SOLETANCHE FREYSSINET, Rueil Malmaison (FR)

(*) Notice: Subject to any disclaimer, the term of this patent is extended or adjusted under 35 U.S.C. 154(b) by 492 days.

(21) Appl. No.: 17/282,458

(22) PCT Filed: Oct. 2, 2019

(86) PCT No.: PCT/FR2019/000155
§ 371 (c)(1),
(2) Date: Apr. 2, 2021

(87) PCT Pub. No.: WO2020/070395
PCT Pub. Date: Apr. 9, 2020

(65) Prior Publication Data
US 2021/0380476 A1  Dec. 9, 2021

(30) Foreign Application Priority Data
Oct. 3, 2018 (FR) .................... 1859181

(51) Int. Cl.
*B05D 1/02* (2006.01)
*C04B 14/48* (2006.01)
(Continued)

(52) U.S. Cl.
CPC .............. *C04B 14/48* (2013.01); *C04B 28/02* (2013.01); *C04B 40/0039* (2013.01);
(Continued)

(58) Field of Classification Search
CPC ........... B05D 1/02; C04B 14/48; C04B 28/02; C04B 40/0039
See application file for complete search history.

(56) References Cited

U.S. PATENT DOCUMENTS 4,275,836 A * 6/1981 Egger .................... B28C 7/165
406/84

FOREIGN PATENT DOCUMENTS

EP    0009660 A1    4/1980
JP    H11278904 A * 10/1999 ............. C04B 28/02
(Continued)

OTHER PUBLICATIONS

JPH11278904A English translation (Year: 2023).*
(Continued)

*Primary Examiner* — Hai Y Zhang
(74) *Attorney, Agent, or Firm* — HSML P. C.

(57) ABSTRACT

A method for reinforcing a structure comprising the following steps:
preparation of UHPFRC comprising a cement precursor mix, of water, a fluidizing agent and metal fibers,
transporting the UHPFRC by pumping to a suitable spray nozzle,
spraying the mix onto a surface of the structure by the addition of a compressed air stream in the spray nozzle.

6 Claims, 1 Drawing Sheet

(51) Int. Cl.
    *C04B 28/02*     (2006.01)
    *C04B 40/00*     (2006.01)
    *E04G 23/02*     (2006.01)
    C04B 103/30      (2006.01)
    C04B 111/00      (2006.01)
    C04B 111/72      (2006.01)
(52) U.S. Cl.
    CPC ...... *E04G 23/0218* (2013.01); *C04B 2103/34* (2013.01); *C04B 2111/00172* (2013.01); *C04B 2111/72* (2013.01)

(56)         References Cited

FOREIGN PATENT DOCUMENTS

JP      H11278904 A      10/1999
JP      2010180106 A      8/2010
JP      2015227559 A     12/2015

OTHER PUBLICATIONS

International Search Report (with English translation) and Written Opinion issued in PCT/FR2019/000155, dated Dec. 12, 2019.

* cited by examiner

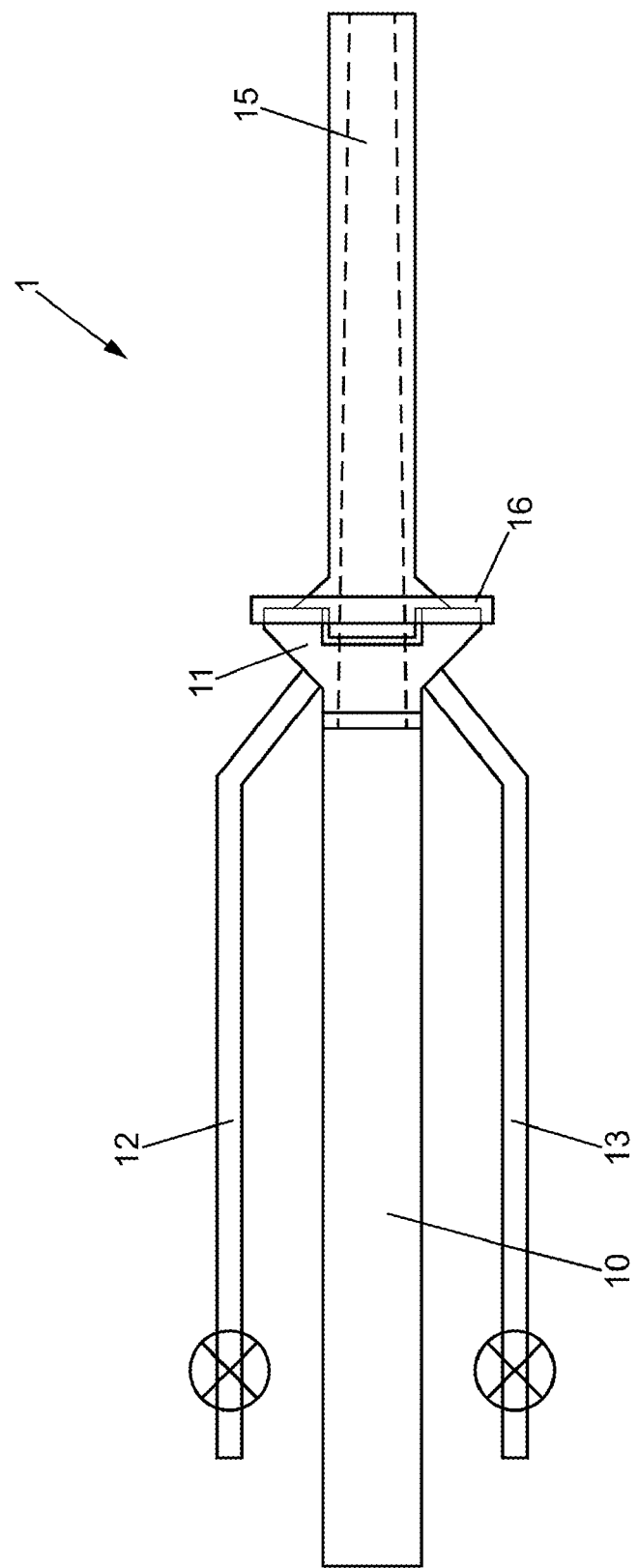

SPRAYING UHPFRC FOR REINFORCEMENT AND REGENERATION OF PRE-EXISTING STRUCTURES

FIELD OF THE DISCLOSURE

The invention relates to the field of repairing, regenerating and reinforcing structures such as tunnels, vaults, metal ducts or galleries with ultra-thin shells made of ultra-high-performance fiber-reinforced concrete (UHPFRC).

BACKGROUND OF THE DISCLOSURE

The concretes that are grouped together under the designation UHPFRC are high-end concretes reinforced with metal, polymer or mineral fibers. These fibers, combined with appropriate plasticizing agents, interact with the cement matrix, making it possible to obtain ductile behavior under traction and reduce or dispense with the use of passive reinforcements. These concretes have a greater tensile and compressive strength than the conventional high-performance concretes.

It is known practice to use UHPFRC in order to regenerate or reinforce structures. However, the UHPFRC is then poured into formworks. The UHPFRCs used in the regeneration and reinforcement of structures are therefore of fluid consistency which allows the formworks to be well filled but requires the use of formworks and a concrete that has a reduced fiber content, that is to say less interesting mechanical properties.

There is therefore a need for a simplified solution allowing structures to be regenerated or reinforced with a UHPFRC with high fiber content.

The invention achieves this by using sprayed UHPFRC combined with an innovative (or "enhanced") pumping solution.

In fact, although it is otherwise also known practice to use a sprayed concrete to regenerate or reinforce structures, the use of UHPFRC with high fiber content runs counter to the solutions ordinarily proposed.

Thus, the concretes sprayed wet for the regeneration or reinforcement of structures have to be highly plastic. Thus, conversely, natively plastic, or fluid, compositions are used for their good suitability for pumping but that require the addition of stiffening agents within the spray gun, for a sufficient grip on the support.

However, UHPFRC is difficult to pump due to the high risk of formation of urchins blocking the pumping when the fiber content of the UHPFRC exceeds 2% by volume. The urchins are entanglements of fibers which block the pumping of the UHPFRC.

It is therefore very difficult to perform structural regeneration or reinforcement operations by spraying UHPFRC with high fiber content, such that the concretes sprayed generally have unsatisfactory mechanical properties.

The need to use a concrete compatible with the pumping operations these days leads to the use of concretes with a consistency corresponding to a slump class of S3 to S4, i.e. 10 to 21 cm, within the meaning of the standard NF EN 206-1; the consistencies of slump class S1 and S2, i.e. 2 to 9 cm, are problematical to use.

Pumping difficulties can also occur because of an excessive friction within the mixes having an excessively compact stone skeleton, a high cement content and a high fraction by volume of metal fibers: the mixes then become increasingly difficult to pump and blockages occur.

The absence of a solution for pumping and spraying a UHPFRC, in particular concerning the UHPFRCs that have a fiber content greater than 2%, has therefore held the person skilled in the art far back from the prospect of using UHPFRC with high fiber content, by spray technique, in order to be able to perform structural regeneration or reinforcement.

Objects and Summary of the Disclosure

The invention relates to a method for regenerating and reinforcing existing structures such as concrete works, and, by extension, the metal framework elements involving the use of connectors. This method consists in spray-covering the walls of the structure by means of an ultra-high-performance fiber-reinforced concrete (UHPFRC).

The invention relates also to nozzles composed of a metal wall of corrugated iron sheets and a certain contiguous ground volume, implementing the method according to the invention.

In this respect, the Applicant has succeeded in developing a novel method for reinforcing a structure comprising the following steps:
  preparing UHPFRC comprising a cement precursor mix (or premix), of water, a fluidizing agent and fibers,
  transporting the UHPFRC by pumping to a suitable spray nozzle,
  spraying the mix onto a surface of the structure by the addition of a compressed air stream in the spray nozzle.

The structure to be reinforced is preferably a buried structure such as a tunnel or a vault. In fact, the buried nature of the structure constitutes a strong constraint which prevents the use of most of the usual reinforcement methods. The method according to the invention is therefore of increased interest in this context.

"Reinforcement" within the meaning of the invention can be performed on a pre-existing structure or on a new structure. In this case, the reinforcement can be a step in the construction of this structure.

The cement precursor mix (or premix) used for the preparation of the UHPFRC is composed of a binder, aggregates and fine pozzolanic reaction elements. The binders are, for example, chosen from among the Portland-type cements, possibly HTS (high silica content).

Thus, the cement precursor mix (or premix) preferably comprises between 700 and 1000 kg of cement per m3 of mix, that is to say a very high cement content, guaranteeing good mechanical properties associated with low porosity.

The aggregates used are, for example, granular elements (sands), acicular elements (for example bauxite fibers, silicon carbide fibers or potassium titanate fibers) or platelet elements (for example platelets of mica, of talc, of mixed silicates or of mixed aluminates). The characteristic size of the aggregates is chosen to be small enough, not to compromise the mechanical properties conferred by the fibers of the UHPFRC, for example less than 2 mm for the granular elements, 1 mm for the acicular or platelet elements.

The fine pozzolanic reaction elements are chosen from among the silica compounds (for example silica fumes), fly ash, blast furnace slag or clay derivatives such as kaolin. These elements have an elementary grain size of between 0.1 μm and 1 μm and make it possible to enhance the compactness of the concrete by closing the pores.

The fibers concerned are preferably metal fibers, for example fibers made of high-strength steel, possibly of stainless steel, or even of steel coated with non-ferrous metal such as copper, zinc or nickel, because the metal fibers confer significant mechanical strength properties. Alternatively, the fibers can be made of polymer material or of mineral material.

In addition to the precursor mix (or premix) and the fibers, the UHPFRC also comprises water. The water content is preferably very small, for example the water/cement weight ratio is less than 0.25, preferably less than 0.20. A very low water content advantageously makes it possible to limit the presence of free water (i.e. the water not involved in the chemical hydration reaction of the cement) and to reduce the porosity of the UHPFRC, in particular the network of connected pores, which gives the UHPFRC a low permeability to noxious agents such as chlorides.

In order to make this low water content possible, the UHPFRC also comprises a fluidizing agent (or dispersant) chosen from among the lignosulfonates, the polynaphthalenes, the derivatives of formaldehyde, the polyacrylates or polycarboxylates of alkali metals and the polyoxides of grafted ethylene.

The fibers have, for example, a smaller mean dimension, e.g. a diameter, of between 0.1 and 0.3 mm and a greater mean dimension, for example a length, of between 10 and 30 mm. Preferably, the greater mean dimension is greater than 14 mm. In fact, although longer fibers are accompanied by an enhanced risk of formation of urchins during pumping, they also confer better mechanical properties, and the invention to a certain extent makes it possible to overcome the problem of the formation of the urchins. The dimension of the fibers will typically depend on the thickness of UHPFRC that is wanted to be sprayed. The greater the thickness desired, the more beneficial will be longer fibers.

The proportion of the fibers is also a key factor in the mechanical properties obtained. Preferably, a high metal fiber content will be used, for example of between 2 and 3.5% by volume of concrete.

However, numerous authors have measured a reduction of the fluidity of the concrete concomitantly with the increase in the metal fiber content and have found that this effect increases with an empirical parameter, the fiber factor, defined as the product of the fiber concentration by the aspect factor of the fibers used.

The UHPFRC is then pumped and fed to a suitable spray nozzle via a duct of useful section matched to the flow rate and pressure necessary to the spraying of the fiber-reinforced concrete mix.

A conveying (or supply) hose is connected to a pump with pistons or cylinders (twinned) with low flow rate, for example of between 2 and 10 m$^3$ per hour, with high working pressure, for example greater than 70 bar, preferably than 80 bar, with large piston diameter, for example greater than 150 mm, preferably than 200 mm, having a great chamber length, for example greater than 400 mm and preferably than 570 mm, and having a great output diameter, for example greater than 100 mm and preferably of the order of 150 mm.

A redimensioning of the activation (or balancing) cylinders of an S valve and of their hydraulic control system is also performed.

This redimensioning makes it possible to rapidly shear the section of the mix of UHPFRC having a high strength in order to minimize the flow rate fluctuations at the pump output while remaining within the working range of the valve activation cylinders.

This adaptation makes it possible to obtain an even flow rate suited to the spraying operation.

A gradual section reducer is disposed between pump output and hose of reduced useful section, corresponding to the spray nozzle or gun input section, 50 mm for example. The reduction of the useful diameter is performed linearly and regularly over several meters of length in order to conserve a uniform distribution of the fibers in the mix in order to prevent the formation of urchins. The transition between a diameter of 125 mm at pump output and a diameter of 50 mm of the hose is obtained over a length of between 5 and 10 m.

The suitable spray nozzle is characterized by a dual compressed air injection. Two diametrically opposite compressed air intakes are connected laterally onto the input section of a convergent forming the nozzle. The nozzle is mounted in the extension of a gun and/or of the hose for pumping/transporting the mix of fiber-reinforced concrete arriving under pressure. The convergent forming the nozzle has a typical useful section of 50 mm diameter, equal to that of the concrete conveying hose. At the output, the nozzle has a useful diameter reduced to a typical fraction of 80%, that is to say 40 mm for 50 mm at the input. The nozzle has a length of between 250 and 500 mm, 300 mm for example for a useful diameter of 50 mm.

The mix is then sprayed onto a surface of the structure to be repaired or reinforced by addition of compressed air. The compressed air stream can be introduced laterally in the nozzle so as to drive the mix.

The reinforcement method according to the invention notably makes it possible to avoid the formation of urchins and therefore obtain a reinforcement by spraying, particularly convenient in the case of buried structures, while benefiting from the excellent mechanical properties of the UHPFRC. Furthermore, the spraying has a synergistic effect with the use of UHPFRC because it makes it possible to obtain a preferential orientation of the fibers which is not obtained when the UHPFRC is poured. This preferential orientation of the fibers translates into better tensile, compressive and flexural strengths in the directions parallel to the surface onto which the UHPFRC is sprayed.

The spraying is typically performed wet with a flow rate of between 2 and 10 m3/h. The more fluid the UHPFRC to be sprayed, the lower the flow rate of compressed air to be applied. Consequently, for one and the same compressed air stream, the more fluid the UHPFRC, the greater the spraying flow rate.

Thus, the spraying is preferably performed wet by the addition of compressed air with a compressed air flow rate at the nozzle or gun of between 10 000 and 17 000 l/min. Typically, the spraying is performed wet by the addition of compressed air with an air pressure of between 5 and 11 bar.

The method according to the invention preferably also comprises a step of preparation of the surface of the structure prior to the spraying of the mix onto the surface. The surface preparation is performed according to techniques known to the person skilled in the art. On the other hand, the use of UHPFRC fiber-reinforced concrete makes it possible to dispense with the installation of passive reinforcements (for example in the form of a welded lattice fixed onto the support, prior to the spraying of the concrete).

Another subject of the invention is a structure repaired, reinforced or regenerated according to the method of the invention, in which the structure has at least one wall spray-coated with UHPFRC.

BRIEF DESCRIPTION OF THE DRAWING

The invention will be able to be better understood from the nonlimiting exemplary embodiment described hereinbelow and on studying the attached drawing in which:

FIG. 1 represents an exemplary embodiment of a spray nozzle that can be used in the method according to the invention.

MORE DETAILED DESCRIPTION

In the context of the present nonlimiting exemplary embodiment, a UHPFRC mix is prepared beforehand having a cement content of 700 to 1000 kg/m3, a silica fume or metakaolin content of 20 to 30% by weight of cement, a metal fiber content of 2 to 3.5% by volume of concrete, a water/cement weight ratio (E/C) less than 0.25 and a shearing threshold of at least 300 Pa for a shear velocity of 0.07 s−1.

The mix concerned does not include stiffening agent.

A pumping operation is performed to pump this mix by means of a pump with pistons (twinned) at a flow rate of 2 to 10 m3 per hour in order to perform a spraying wet.

The spraying operation itself is performed by the addition of compressed air with a compressed air flow rate at the nozzle or gun of between 10 000 and 17 000 l/min and an air pressure of between 5 and 11 bar.

The nozzle used is a nozzle of 50 mm useful diameter at the input.

The spraying is done onto a surface made of concrete, of metal, of wood or even of previously prepared masonry.

No addition of stiffening agent is performed during the nozzle or gun spraying.

Thus, a coating of a layer of UHPFRC is performed with a thickness equal to at least two times the length of the greatest metal fiber.

The characteristics of this coating are assessed according to the standard NF P 18-470. A mean compression strength at 28 days of 90 to 180 MPa is measured, as is a mean tensile elastic limit at 28 days of 4 to 10 MPa, and post-cracking properties conforming to the non-brittle criterion in section 9.1 of the standard NF P18-710.

The fiber-reinforced mix is of firm, relatively dry and non-workable consistency within the meaning of the standard NF EN 206-1 and its consistency class (S1 or S2) is outside of the range covered by the standard NF P 18 470 concerning UHPFRC.

This does not prevent the fiber-reinforced mix from being pumped over a distance of more than 100 m by means of a piston pump and sprayed with compressed air at very high flow rate with a small nozzle diameter of 50 mm, making it possible to achieve yields of 2 to 10 m3/h without the formation of urchins, or the segregation of the mix during the pumping and the spraying.

Because of the length of the pipes that can be up to a hundred or so meters, the reduced diameter at the nozzle output of the order of 50 mm, the rheology of the UHPFRC having a high shear threshold and viscosity, the risk of formation of urchins and of heating of the product in the pipes, it was necessary to choose a piston pump rather than a rotor pump so as to prioritize the working pressure over the flow rate.

For this, the Applicant selected a pump with pistons or cylinders (twinned) with low flow rate, i.e. of between 2 and 10 m3 per hour, with high working pressure, i.e. of 80 bar at least, with large piston diameter, i.e. of 200 mm, having a great chamber length, i.e. of 570 mm at least, and having a large output diameter, for example of the order of 150 mm.

The pump is equipped with a so-called "S" valve associated with a balancing mechanism. The power of the activation cylinders (transverse cylinders ensuring the balance) of the S valve and their hydraulic control system were adapted to prevent or limit the flow rate fluctuations.

This redimensioning makes it possible to rapidly shear the section of fiber-reinforced concrete (UHPFRC) having a high strength in order to minimize the flow rate fluctuations while remaining within the working range of the cylinders.

This adaptation makes it possible to obtain a flow rate that is even and suited to the operation of spraying a fiber-reinforced mix with high viscosity.

The spraying can be done manually or by means of a robot. The spraying can be performed in one layer or in several successive layers without exceeding a delay of three hours between successive layers, notably in order to avoid the formation of cold joints.

FIG. 1 shows a nozzle 1 suited to spraying of UHPFRC. The nozzle is mounted on an end of a UHPFRC intake pipe 10. It comprises a triple-input intake 11 which allows the mixing of the UHPFRC originating from the pipe 10 with a compressed air stream. The compressed air stream can be single or dual, and originates from a coupling of the intake to one and/or the other compressed air supply 12, 13. The triple-input intake 11 is linked to a spray gun 15. The link between the triple-input intake 11 and the spray gun 15 can be of any kind and for example consist of snap-fitting or screwing means. Advantageously, the link is provided with a fusible safety bushing 16 allowing the spray nozzle or gun 15 to be detached in the event of a pressure greater than a certain threshold, for example when the spray gun is plugged.

The fusible safety bushing makes it possible to prevent damage to the nozzle 1. It can be provided with a bypass to UHPFRC containing means, not represented.

The spray gun 15 has a substantially circular section and a dimension less than or equal to that of the UHPFRC intake pipe 10. If the section of the spray gun 15 is chosen to be less than that of the UHPFRC intake pipe 10, there is a consequential increase in the pressure in the spray gun which can allow for a better spraying of the concrete.

For example, the pipe 10 can have a circular section of 50 mm diameter and the spray gun 15 can have a circular section of a diameter of between 40 and 50 mm.

The length of the spray gun is advantageously between 300 and 400 mm for reasons of maneuverability of the gun and for pressure-containing purposes.

Advantageously, the UHPFRC intake pipe 10 is flexible. It can consist of a material that may or may not be elastically deformable.

Conversely, the spray gun 15 advantageously consists of a rigid material.

The spray gun 15 and the UHPFRC intake pipe 10 are required to be handled, so they are advantageously thermally insulated, in order to be able to spray in total safety when the mix heats up.

It is understood that the embodiments described are nonlimiting and that improvements can be made to the invention without departing from the scope thereof.

Unless stipulated otherwise, the word "or" is equivalent to and/or. Likewise, the word "one" is equivalent to "at least one" unless stipulated otherwise.

The invention claimed is:

1. A method for reinforcing a structure comprising:
   preparing fiber-reinforced concrete comprising a cement precursor mix, water, a fluidizing agent and metal fibers, the fiber-reinforced concrete having a metal fiber content of at least 2% by volume of concrete;
   transporting the fiber-reinforced concrete by pumping to a spray nozzle;

spraying the fiber-reinforced concrete onto a surface of the structure by the addition of a compressed air stream in the spray nozzle wherein the spray nozzle is mounted on an end of an intake pipe and comprises a triple-input intake for mixing of the fiber-reinforced concrete originating from the intake pipe with a single or dual compressed air stream, wherein pumping is carried out with a pump with twinned pistons;

a flow rate of the mixture from the pump is between 2 and 10 m$^3$ per hour; and the spraying is performed wet by the addition of the compressed air stream with a compressed air flow rate at the spray nozzle of between 10,000 and 17,000 l/min and with an air pressure of between 5 and 11 bar.

2. The method as claimed in claim 1, wherein the fiber-reinforced concrete has a metal fiber content of between 2 and 3.5% by volume of concrete.

3. The method as claimed in claim 1, wherein the cement precursor mix comprises between 700 and 1000 kg of cement per m3 of mix.

4. The method as claimed in claim 1, wherein the fiber-reinforced concrete has a water/cement weight ratio of less than 0.25.

5. The method as claimed in claim 1, wherein the metal fibers have a greater mean dimension greater than 14 mm.

6. The method as claimed in claim 1, wherein a working pressure of the pump is greater than 80 bar.

\* \* \* \* \*